June 24, 1958 F. H. GREEN 2,839,900
REGENERATIVE VORTEX COOLING SYSTEMS
Filed Aug. 31, 1950 2 Sheets-Sheet 1

FREDERICK H. GREEN,
INVENTOR.

BY
ATTORNEY

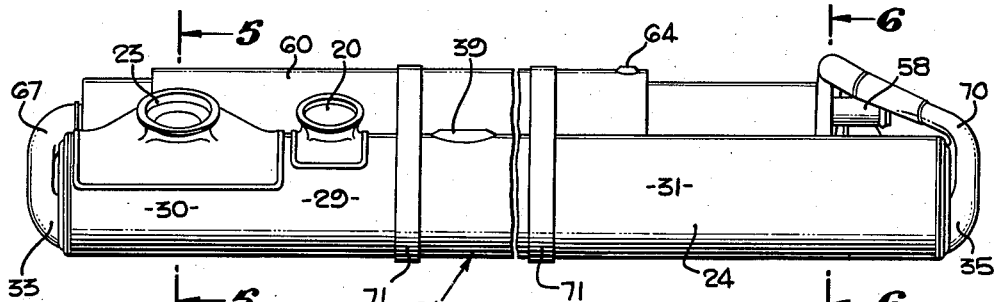
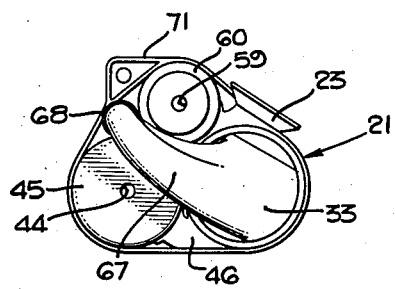
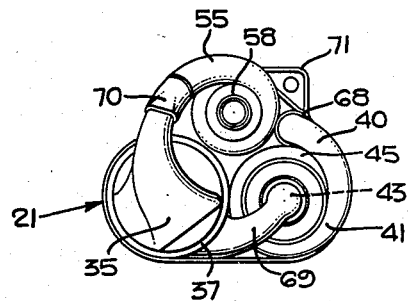
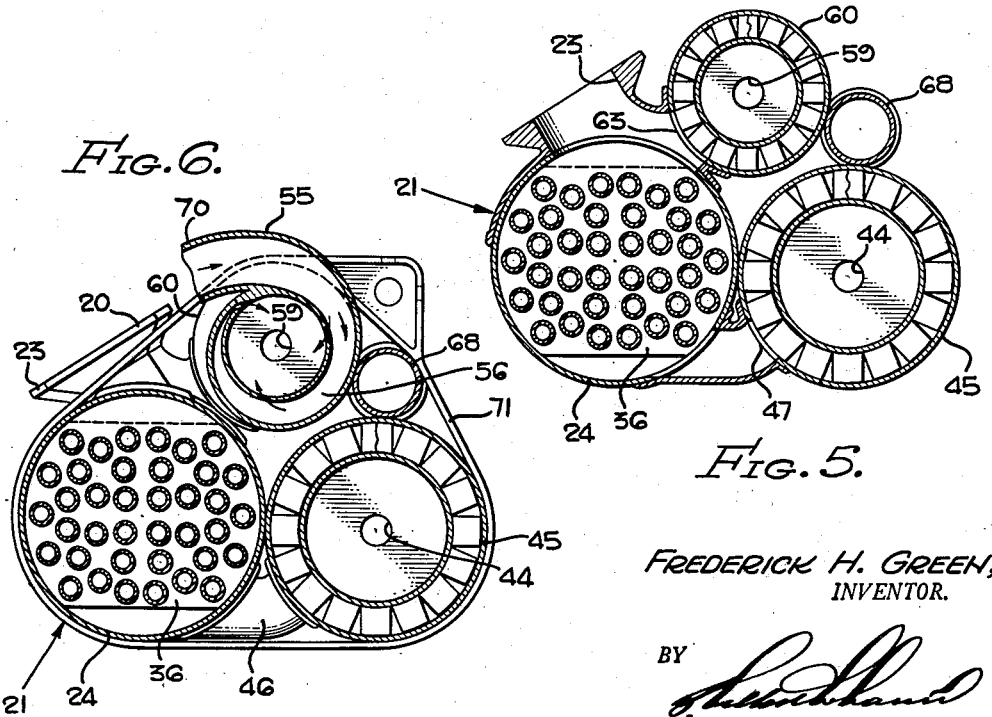
Frederick H. Green,
INVENTOR.

United States Patent Office
2,839,900
Patented June 24, 1958

2,839,900

REGENERATIVE VORTEX COOLING SYSTEMS

Frederick H. Green, Palos Verdes Estates, Calif., assignor to The Garrett Corporation, Los Angeles, Calif., a corporation of California Application August 31, 1950, Serial No. 182,455

19 Claims. (Cl. 62—136)

My invention relates in general to air conditioning equipment and relates in particular to a simple device for cooling a gaseous medium. Herein "gas" and "gaseous medium" include air which consists of a mixture of gases.

It is an object of the invention to provide a device of simple form and light weight, having no continuously moving parts for cooling a gaseous medium which moves from any zone of relatively higher pressure to a zone of relatively lower pressure and which is also useful for cooling air in high speed aircraft, such for example as jet driven craft, rockets and missiles.

It is an object of the invention to provide a system for cooling a gaseous medium under pressure, wherein a gaseous medium is the only fluid entering into the cooling operation of the device. The system therefore requires no power source other than that which may be employed for compressing a gaseous medium and requires no condensable refrigerant. Also, the equipment employed in the system is of such size that it will fit into a relatively small space.

It is an object to provide a simple apparatus wherein one flow of gaseous medium is cooled by passage through a vortex tube and is employed to cool a second flow of gaseous medium which is subsequently further cooled by being passed through a vortex tube.

It is a further object of the invention to provide a device of the character described in the foregoing paragraph comprised of simple parts arranged in a structure of compact form and having means for bringing a coolant into contact with the external surfaces of the vortex tubes.

A further object of the invention is to provide a simple system for use in an aircraft having a jet compressor, this system providing means for diverting a suitable portion of compressed air from the jet compressor, cooling this diverted compressed air by coolant air taken from the ram air duct which supplies the jet engine compressor, the system having vortex tubes for further cooling the compressed air and having heat exchange employing coolant air received from the ram air duct.

It is a further object of the invention to provide a cooling means for a gaseous medium having a vortex tube having a compressed gas inlet and a cooled gas outlet, this vortex tube operating to cool the gaseous medium without employment of a hot air outlet in the vortex tube.

Further objects and advantages of the invention will be brought out in the following part of the specification wherein a preferred embodiment of the invention has been described in extensive detail for the purpose of making a disclosure of the invention without limiting the scope thereof which is set forth in the claims.

Referring to the drawings which are for illustrative purposes only:

Fig. 2 is a side elevational view of the cooling unit shown in Fig. 1.

Fig. 3 is a view of the left end of Fig. 2.

Fig. 4 is a view of the right end of Fig. 2.

Fig. 5 is an enlarged sectional view taken on the line 5—5 of Fig. 2.

Fig. 6 is an enlarged sectional view taken as indicated by the line 6—6 of Fig. 2.

Figures 1, 7:
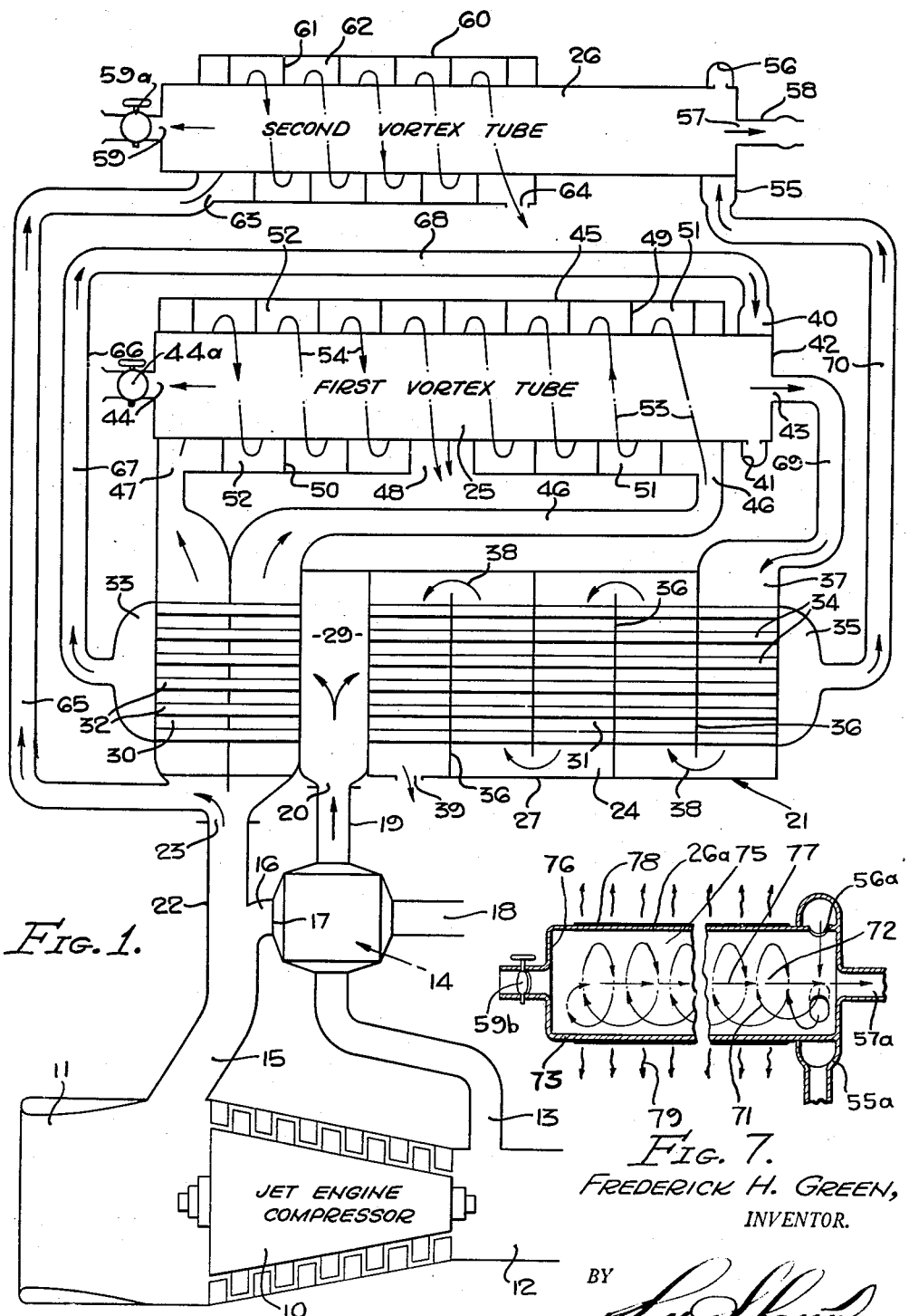
Fig. 1 is a schematic view of a simple embodiment of my air cooling system.
Fig. 7 is a fragmentary sectional view showing an alternative means for dissipating heat from a vortex tube.

Referring to Fig. 1, I show a jet engine compressor 10 of an aircraft arranged to receive air through a ram air duct 11 and to discharge compressed air into a delivery duct 12. A compressed air bleed duct 13 is connected to the delivery duct 12 and delivers compressed air to a heat exchanger 14. With relation to the rest of the air conditioning system embraced in the present invention, the heat exchanger 14 may be regarded as a preliminary heat exchanger wherein compressed air from the jet engine compressor 10 is cooled by air received from the ram duct 11. The ram air delivery duct 15 extends from the ram duct 11 and a branch 16 thereof is connected to the coolant inlet 17 of the heat exchanger 14 having a coolant air outlet 18. The compressed air which has been brought into heat exchange relation to the ram air in the heat exchanger 14 is delivered therefrom through a compressed air duct 19 which is connected to the compressed air inlet 20 of a cooling unit 21. A branch 22 of the ram air duct 15 is connected to the ram air inlet 23 of the cooling unit 21.

The cooling unit 21 comprises three tubular sections namely, heat exchanger 24, first vortex tube 25 and second vortex tube 26 bound together in side by side relation by straps 71. The heat exchanger 24 has an outer cylindric wall 27. Within the heat exchanger 24 there is a transverse space 29 communicating with the compressed air inlet 20. The space 29 defines a plane of division dividing the heat exchanger 24 into a first section 30 and the second section 31. The first section 30 of the heat exchanger 24 has therein tubes 32 defining air passages for conducting compressed air from the chamber 29 to the outlet 33, in heat exchange relation to ram air.

The ram inlet 23 communicates directly with the coolant passages of the first section 30. The second section 31 of the heat exchanger 24 has tubes 34 extending lengthwise thereof for conducting air from the compressed chamber 29 to the compressed air outlet 35. Transverse baffles 36 are spaced lengthwise of the heat exchanger section 31 and are arranged so that air, entering a coolant inlet 37 in the wall 27, will pass in zigzag fashion through the coolant passages of the section 31 as indicated by arrows 38, to a coolant outlet port 39 in the wall 27 adjacent the compressed air inlet 20.

The first vortex tube 25 has at its rightward end an inlet member 40 defining a scroll passage 41 for inlet of compressed air, and at the rightward end of the vortex tube 25 there is a transverse wall 42 having an outlet opening 43 for cooled air. At the leftward end of the tube 25 there is an outlet opening 44 for relatively hot air, this outlet opening 44 having a valve 44a for regulating or entirely stopping flow of air therethrough. A cylindric shell 45 surrounds the vortex tube 25, this shell 45 having inlet ports 46 and 47 at the opposite ends thereof, a common outlet port 48, and helical partition walls 49 and 50 arranged within the cylindrical wall or shell 45 and around the wall of the vortex tube 25 so as to define helical passages 51 and 52 for carrying coolant air respectively from the inlet ports 46 and 47 to the outlet port 48 as indicated by arrows 53 and 54.

The second vortex tube 26 has a compressed air inlet member 55 at its rightward end defining a scroll inlet passage 56 for delivery of compressed air into the rightward end of the tube 26 which has therein a cooled air outlet opening 57 communicating with a cooled air outlet pipe 58 adapted to be connected to a duct for carrying cooled compressed air to the place where it is to be utilized. At the leftward end of the vortex tube 26 there is a port or outlet passage 59 for the discharge of relatively hotter air, this passage 59 having therein a valve 59a which may be partly closed to reduce the flow through the outlet passage or which may be entirely closed so as to completely close the outlet passage 59 and prevent any escape of relatively hotter air from the rear end of the vortex tube 26. When the valves 44a and 59a are open some of the heat extracted from the air which is delivered through the outlets 43 and 57 is carried off by the air which passes through the outlets 44 and 59 and the remainder of the extracted heat is conducted through the walls of the vortex tubes 25 and 26 to coolant air following in the passages 51, 52 and 62, but when the valves 44a and 59a are completely closed, the vortex tubes 25 and 26 are without outlets for relatively hotter air and heat dissipation is then solely through the vortex tube walls to the coolant flowing through the passages 51, 52 and 62. Around a portion of the second vortex tube 26 a cylindric shell 60 is supported, to define a jacket for bringing a coolant air into heat exchange relation to the vortex tube 26. Helical wall 61, within the jacket 60, defines therein a helical air passage 62 along the surface of the tube 26. The jacket 60, defines therein a helical air passage 62 along the surface of the tube 26. The jacket 60 has an outlet port 64 and an inlet port 63 which is in direct communication with the inlet 23 as shown in Fig. 5 and as shown schematically in Fig. 1 at 65, so as to receive ram air delivered through the duct element 22.

The flow of compressed air which enters the port 20 is divided within the chamber 29 so that a portion thereof flows leftward and the remainder flows rightward. Compressed air which is cooled by passage through the first section 30 of the heat exchanger 24 is conducted from the outlet 33 by a tubular duct 66 having a portion 67 which passes across the leftward end of the cooler as shown in Figs. 2 and 3 and a portion 68 which passes lengthwise of the unit 21 in the longitudinal channel between the cylindrical walls or shells 45 and 60 which respectively surround the vortex tubes 25 and 26 as shown in Figs. 5 and 6. The rightward end of the duct portion 68 is connected with the inlet member 40 of the first vortex tube 25.

The first flow of compressed air, from the first section 30 of the heat exchanger 24 is delivered into the vortex tube 25 as hereinbefore explained and a portion of this compressed air, cooled by the action of the vortex tube passes out through the outlet opening 43 and is carried by a duct 69 to the inlet 37 of the coolant passage of the second heat exchanger section 31, to effectively cool the compressed air which passes from the air chamber 29 through the tubes 34 to the outlet 35. A duct 70 connects the outlet 35 with the inlet member 55 of the second vortex tube 26 wherein this cooled compressed air is subjected to vortex cooling action, and a selected portion thereof, in further cooled condition, is delivered through the cooled air outlet 57 to the delivery pipe 58 forming a part of the path of flow along which the cooled air passes to its place of utilization. The selection of the proportion of the total received air delivered from a vortex tube as cooled air depends upon the size of the hot air outlet. In some uses of the invention, the hot air outlets of the vortex tubes may be completely closed. All of cooling action required to produce the relatively low final temperature which is characteristic of the disclosed system, is accomplished by use of gaseous medium, without continuously moving mechanical parts other than those which may be used in the source of compressed gaseous medium.

The adjustment of the valve 59a may depend upon a number of factors involved in the operation of the disclosed equipment. One of these is the temperature required for the cooled air discharged through the outlet port 57 of the vortex tube 26. Others include the heat absorbing capacities of the coolant flows. Where, for example, the temperature of the coolant passing through the passage 62 around the wall of the vortex tube 26 is reduced, closing of the valve 59a may be effected, and in certain instances the valve 59a may be completely closed, or the vortex tube may be constructed with only a compressed air inlet and a cooled air outlet, and without an outlet, such as the outlet 59, for discharge of relatively hotter air.

The invention comprehends a cooling means for gaseous fluid having a vortex tube which may have its heated gaseous fluid outlet completely closed or entirely omitting the outlet for heated gaseous fluid, and comprising a hollow or tubular wall structure defining a space in which the vortex is effective, this wall structure having means for dissipating heat from the gaseous fluid which is moving through the vortex. Theoretical considerations which I believe to be involved in my present invention, may be explained with relation to Fig. 7 wherein I schematically show a vortex tube 26a having its front end gaseous fluid inlet means 55a including a wall structure having one or more nozzle openings 56a causing the gaseous fluid to swirl as indicated by arrows 71. This swirling gaseous fluid comprises the vortex 72 which is characteristic of the device. The vortex tube 26a has a cylindrical wall 73 of heat conductive metal defining the space 75 in which the swirling gaseous fluid forms the vortex 72. With the valve 59b completely closed, the swirling gas, entering through the nozzle 56a at sonic velocity, follows the helical path along the interior surface of the wall 73 defined by the arrows 71, and then near the rear end 76 of the tube 26a the gas turns inwardly toward the axis of the cylindrical wall 73 and then moves axially to the cooled gas outlet 57a as indicated by arrows 77. The outer surface of the wall is prepared so that it will have good heat radiation qualities. That is to say, it is given a dull, dark finish, such as provided by an external coating of oxide or black paint 78, the result being that heat from the swirling air is conducted through the metal wall 73 and radiated from the surface finish 78 as indicated by arrows 79. The design of the vortex tube 26a, in order to carry out the teachings hereinbefore set forth, should be such that the vortex effect shall be carried close to the rear end 76 of the tube 26a, or in other words, so that the gas will swirl for a long distance in contact with the heat conductive surrounding structure formed in part by the wall 73.

I claim:

1. In a system for supplying cooled air in an aerial vehicle having a compressor, a ram air duct and heat exchange means employing ram air to cool compressed air from said compressor: first vortex tube means; second vortex tube means, said second vortex tube means having a cooled air outlet for delivery of the supply of cooled air; means establishing a first path of flow of compressed air from said heat exchange means to the inlet of said first vortex tube means, said path of flow having therein a first heat exchanger for passing said compressed air in heat exchange relation to ram air; means establishing a second path of flow of compressed air from said heat exchange means to the inlet of said second vortex tube, said second path of flow having therein a heat exchanger with means for passing cooled air from the cooled air outlet of said first vortex tube in heat exchange relation to the compressed air moving in said second path of flow; and means for passing ram air in heat exchange relation to said vortex tubes.

2. In a system for supplying cooled air in an aerial vehicle having a compressor, a ram air duct and heat exchange means employing ram air to cool compressed air from said compressor: first vortex tube means; second vortex tube means, said second vortex tube means having a cooled air outlet for delivery of the supply of cooled air; means establishing a first path of flow of compressed air from said heat exchange means to the inlet of said first vortex tube means, said path of flow having therein a first heat exchanger for passing said compressed air in heat exchange relation to ram air; means establishing a second path of flow of compressed air from said heat exchange means to the inlet of said second vortex tube, said second path of flow having therein a heat exchanger with means for passing cooled air from the cooled air outlet of said first vortex tube in heat exchange relation to the compressed air moving in said second path of flow; and means for passing a coolant in heat exchange relation to at least one of said vortex tubes.

3. In a system for supplying cooled air in an aerial vehicle having a compressor, a ram air duct and heat exchange means employing ram air to cool compressed air from said compressor: first vortex tube means; second vortex tube means, said second vortex tube means having a cooled air outlet for delivery of the supply of cooled air; means establishing a first path of flow of compressed air from said heat exchange means to the inlet of said first vortex tube means, said path of flow having therein a first heat exchanger for passing said compressed air in heat exchange relation to ram air; and means establishing a second path of flow of compressed air from said heat exchange means to the inlet of said second vortex tube, said second path of flow having therein a heat exchanger with means for passing cooled air from the cooled air outlet of said first vortex tube in heat exchange relation to the compressed air moving in said second path of flow.

4. In a system for supplying cooled air in an aerial vehicle having a compressor and a ram air duct: first vortex tube means; second vortex tube means, said second vortex tube means having a cooled air outlet for delivery of the supply of cooled air; means establishing a first path of flow of compressed air from said compressor to the inlet of said first vortex tube means, said path of flow having therein a heat exchanger for passing said compressed air in heat exchange relation to the ram air; means establishing a second path of flow of compressed air from said compressor to the inlet of said second vortex tube, said second path of flow having therein a heat exchanger with means for passing cooled air from the cooled air outlet of said first vortex tube in heat exchange relation to the compressed air moving in said second path of flow; and means for passing ram air in heat exchange relation to said vortex tubes.

5. In a system for supplying cooled air in an aerial vehicle having a compressor and a ram air duct: first vortex tube means; second vortex tube means, said second vortex tube means having a cooled air outlet for delivery of the supply of cooled air; means establishing a first path of flow of compressed air from said compressor to the inlet of said first vortex tube means, said path of flow having therein a heat exchanger for passing said compressed air in heat exchange relation to ram air; and means establishing a second path of flow of compressed air from said compressor to the inlet of said second vortex tube, said second path of flow having therein a heat exchanger with means for passing cooled air from the cooled air outlet of said first vortex tube in heat exchange relation to the compressed air moving in said second path of flow.

6. In a system for supplying cooled air in an aerial vehicle having a compressor and ram air duct: first vortex tube means; second vortex tube means, said second vortex tube means having a cooled air outlet for delivery of the supply of cooled air; means establishing a first path of flow of compressed air from said compressor to the inlet of said first vortex tube means, said path of flow having therein a heat exchanger for passing said compressed air in heat exchange relation to ram air; means establishing a second path of flow of compressed air from said compressor to the inlet of said second vortex tube, said second path of flow having therein a heat exchanger with means for passing cooled air from the cooled air outlet of said first vortex tube in heat exchange relation to the compressed air moving in said second path of flow; and means for passing a coolant in heat exchange relation to at least one of said vortex tubes.

7. In a system for cooling a flow of gaseous medium which moves from a source of said gaseous medium to a place of disposal: first vortex tube means; second vortex tube means; means establishing a path of flow of gaseous medium to the inlet of said first vortex tube means, said path of flow having therein a first heat exchanger for passing the gaseous medium in heat exchange relation to a coolant; means establishing a second path of flow from said source to the inlet of said second vortex tube means, said second path of flow having therein a heat exchanger for passing the gaseous medium in said second path of flow in heat exchange relation to cooled gaseous medium which issues from said first vortex tube means; and means for bringing a coolant into heat exchange relation to at least one of said vortex tube means.

8. In a system for cooling a flow of gaseous medium which moves from a source of said gaseous medium to a place of disposal: first vortex tube means; second vortex tube means; means for delivering a flow of gaseous medium to the inlet of said first vortex tube means; means establishing a path of flow from said source to the inlet of said second vortex tube means, said path of flow having therein a heat exchanger for passing the gaseous medium in said path of flow in heat exchange relation to cooled gaseous medium which issues from said first vortex tube means; and means for bringing a coolant into heat exchange relation to at least one of said vortex tube means.

9. In a system for cooling a flow of gaseous medium which moves from a source of said gaseous medium to a place of disposal: first vortex tube means; second vortex tube means; means establishing a path of flow of gaseous medium to the inlet of said first vortex tube means, said path of flow having therein a first heat exchanger for passing the gaseous medium in heat exchange relation to a coolant; and means establishing a second path of flow from said source to the inlet of said second vortex tube means, said second path of flow having therein a heat exchanger for passing the gaseous medium in said second path of flow in heat exchange relation to the cooled gaseous medium which issues from said first vortex tube means.

10. In a system for cooling a flow of gaseous medium which moves from a source of said gaseous medium to a place of disposal: first vortex tube means; second vortex tube means; means for delivering a flow of gaseous medium to the inlet of said first vortex tube means; and means establishing a path of flow from said source to the inlet of said second vortex tube means, said path of flow having therein a heat exchanger for passing the gaseous medium in said path of flow in heat exchange relation to cooled gaseous medium which issues from said first vortex tube means.

11. In a cooling device of the character described: first and second vortex tubes in side by side relation; a heat exchanger of tubular form arranged along said vortex tubes, said heat exchanger having a compressed gas inlet intermediate its ends dividing the heat exchanger into first and second sections having compressed gas passages and coolant passages, the compressed gas outlet of said first section being connected to the inlet of said first vortex tube, and the compressed gas outlet of said second section being connected to the inlet of said second vortex tube; means arranged to conduct a coolant through the coolant passages of said first section; means for conducting cooled gas from said first vortex tube through the coolant passages of said second section to cool the gas which is moving in the compressed gas passages of said second section; and means for bringing a coolant into heat exchange relation to at least one of said vortex tubes.

12. In a cooling device of the character described: first and second vortex tubes in side by side relation; a heat exchanger of tubular form arranged along said vortex tubes, said heat exchanger having a compressed gas inlet intermediate its ends dividing the heat exchanger into first and second sections having compressed gas passages and coolant passages, the compressed gas outlet of said first section being connected to the inlet of said first vortex tube, and the compressed gas outlet of said second section being connected to the inlet of said vortex tube; means arranged to conduct a coolant through the coolant passages of said first section; and means for conducting cooled gas from said first vortex tube through the coolant passages of said second section to cool the gas which is moving in the compressed gas passages of said second section.

13. In a system for cooling a flow of gaseous medium which moves from a source of said gaseous medium to a place of disposal: first vortex tube means; second vortex tube means; means for delivering a flow of gaseous medium to the inlet of said first vortex tube means; means establishing a path of flow from said source to the inlet of said second vortex tube means, said path of flow having therein a heat exchanger for passing the gaseous medium in said path of flow in heat exchange relation to cooled gaseous medium which issues from said first vortex tube means; and means adapted to bring a coolant into heat exchange relation to at least one of said vortex tube means.

14. In a system for cooling a flow of gaseous medium which moves from a source of said gaseous medium to a place of disposal: first vortex tube means; second vortex tube means, at least a part of said vortex tube means having only an inlet for gaseous medium to be cooled and an outlet for cooled gaseous medium; means for delivering a flow of gaseous medium to the inlet of said first vortex tube means; means establishing a path of flow from said source to the inlet of said second vortex tube means, said path of flow having therein a heat exchanger for passing the gaseous medium in said path of flow in heat exchange relation to cooled gaseous medium which issues from said first vortex tube means; and means adapted to bring a coolant into heat exchange relation to at least said vortex tube means having only an inlet for gaseous medium and an outlet for cooled gaseous medium.

15. A vortex tube for cooling a gaseous medium, comprising: a wall forming an outlet for cooled gaseous medium; walls forming means including an inlet nozzle adapted to swirl said gaseous medium around the axis defined by said outlet and away from said outlet to form a vortex; and a hollow structure surrounding and defining a space in which said gaseous medium is caused to swirl by said means, at least a portion of said gaseous medium passing axially through said vortex to and through said outlet in cooled condition, said structure having a circumferential wall of heat conductive material for conducting to the exterior heat received from said gaseous medium swirling in said vortex, a heat radiating surface in contacting relationship with said heat conductive wall for radiating to the exterior of said tube substantially all of the heat removed from the gaseous medium which passes out through said outlet.

16. In a vortex tube for cooling a gaseous medium: a tube having a heat conductive wall portion; means for delivery of the gaseous medium to be cooled into said tube; outlet means for the discharge of the cooled gaseous medium from the tube; swirl producing means for swirling the gaseous medium in said tube; means for closing the tube against escape of gaseous medium therefrom other than through said outlet means; and a heat radiating surface in contacting relationship with said heat conductive portion of said tube wall for radiating to the exterior of said tube substantially all of the heat removed from the gaseous medium which passes out through said outlet means.

17. In a vortex tube for cooling a gaseous medium: a tube having a heat conductive wall portion; means for delivery of the gaseous medium to be cooled into said tube; outlet means at the front end of said tube for the discharge of the cooled gaseous medium from the tube; swirl producing means for swirling the gaseous medium in said tube; means for closing the rear end of said tube; and a heat radiating surface in contacting relationship with said heat conductive portion of said tube wall for radiating to the exterior of said tube substantially all of the heat removed from the gaseous medium which passes out through said outlet means.

18. In a vortex tube for cooling a gaseous medium: a tube having a heat conductive wall portion; means for delivery of the gaseous medium to be cooled into said tube; outlet means at the front end of said tube for the discharge of the cooled gaseous medium from the tube; swirl producing means for swirling the gaseous medium in said tube; means for closing the rear end of said tube comprising an outlet opening and a valve for closing said opening; and a heat radiating surface in contacting relationship with said heat conductive portion of said tube wall for radiating to the exterior of said tube substantially all of the heat removed from the gaseous medium which passes out through said outlet means.

19. A vortex tube for cooling a gaseous medium as recited in claim 15 wherein said heat radiating surface is a dark coating.

References Cited in the file of this patent

UNITED STATES PATENTS

| | | |
|---|---|---|
| 1,812,339 | Horne et al. | June 30, 1931 |
| 1,952,281 | Ranque | Mar. 27, 1934 |
| 2,445,115 | Hanrahan | July 13, 1948 |
| 2,509,899 | Wood et al. | May 30, 1950 |
| 2,519,028 | Dodge | Aug. 15, 1950 |
| 2,586,002 | Carson et al. | Feb. 19, 1952 |
| 2,650,582 | Green | Sept. 1, 1953 |

FOREIGN PATENTS

| | | |
|---|---|---|
| 605,691 | Germany | Nov. 16, 1934 |

UNITED STATES PATENT OFFICE
CERTIFICATE OF CORRECTION

Patent No. 2,839,900                                                      June 24, 1958

Frederick H. Green

It is hereby certified that error appears in the printed specification of the above numbered patent requiring correction and that the said Letters Patent should read as corrected below.

Column 7, line 18, before "vortex" insert -- second --.

Signed and sealed this 9th day of September 1958.

(SEAL)
Attest:

KARL H. AXLINE                                                  ROBERT C. WATSON

Attesting Officer                                             Commissioner of Patents